(12) United States Patent
Nishizawa et al.

(10) Patent No.: US 7,118,806 B2
(45) Date of Patent: Oct. 10, 2006

(54) PLASTIC MOLDED PRODUCT HAVING PHOTOCHROMIC CHARACTERISTIC AND/OR POLARIZING CHARACTERISTICS

(75) Inventors: Chiharu Nishizawa, Ibaraki (JP); Kenji Kouno, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/478,726

(22) PCT Filed: Jun. 1, 2001

(86) PCT No.: PCT/JP01/04634

§ 371 (c)(1),
(2), (4) Date: Nov. 25, 2003

(87) PCT Pub. No.: WO02/099513

PCT Pub. Date: Dec. 12, 2002

(65) Prior Publication Data

US 2004/0156086 A1 Aug. 12, 2004

(51) Int. Cl.
*B32B 27/36* (2006.01)

(52) U.S. Cl. .................. 428/412; 264/176.1; 264/219; 359/642; 528/196; 528/198

(58) Field of Classification Search ............ 264/176.1, 264/219; 359/642, 241; 428/412; 528/196, 528/198
See application file for complete search history.

(56) References Cited

U.S. PATENT DOCUMENTS

| | | | | |
|---|---|---|---|---|
| 4,611,892 A | * | 9/1986 | Kawashima et al. | 351/159 |
| 4,910,283 A | * | 3/1990 | Kawaki et al. | 528/201 |
| 5,589,244 A | * | 12/1996 | Takada | 428/848.9 |
| 5,827,614 A | | 10/1998 | Bhalakia et al. | |
| 5,858,499 A | | 1/1999 | Abe et al. | |
| 5,926,310 A | | 7/1999 | Tamura et al. | |
| 6,316,576 B1 | * | 11/2001 | Fujimori et al. | 528/196 |
| 6,659,608 B1 | * | 12/2003 | Yamamoto et al. | 351/163 |
| 2002/0006505 A1 | * | 1/2002 | Nishizawa et al. | 428/220 |
| 2002/0084023 A1 | * | 7/2002 | Yamamoto et al. | 156/244.27 |
| 2002/0135735 A1 | * | 9/2002 | Yamamoto et al. | 351/163 |

FOREIGN PATENT DOCUMENTS

| | | |
|---|---|---|
| JP | 64-20228 | 1/1989 |
| JP | 1-170904 | 7/1989 |
| JP | 3-96901 | 4/1991 |
| JP | 8-52817 | 2/1996 |
| JP | 9-5683 | 1/1997 |
| JP | 2000-302860 | 10/2000 |
| JP | 2001 311918 | * 11/2001 |

* cited by examiner

*Primary Examiner*—Terressa Boykin
(74) *Attorney, Agent, or Firm*—Sughrue Mion, PLLC

(57) ABSTRACT

A plastic molded article laminated a layer with a photochromic property and/or a layer with a polarization property on at least one side of a base material, said base material being a polycarbonate having a photoelastic constant of $55 \times 10^{-12}$ $m^2/N$ or below.

12 Claims, 3 Drawing Sheets

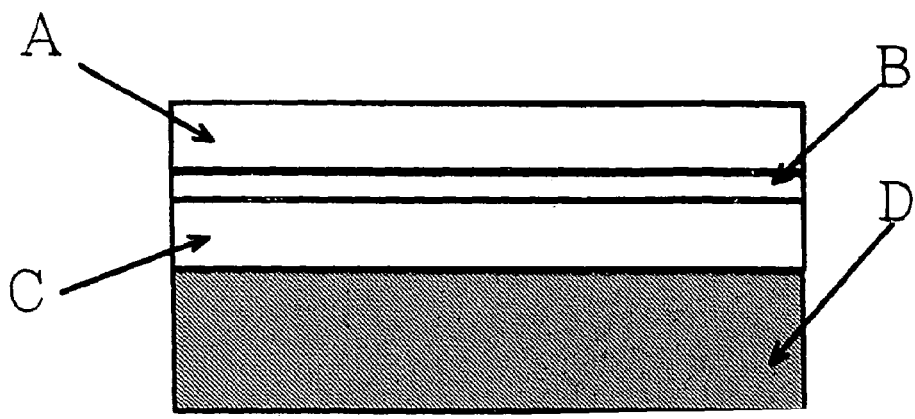
Figure 1   Plastic molded article
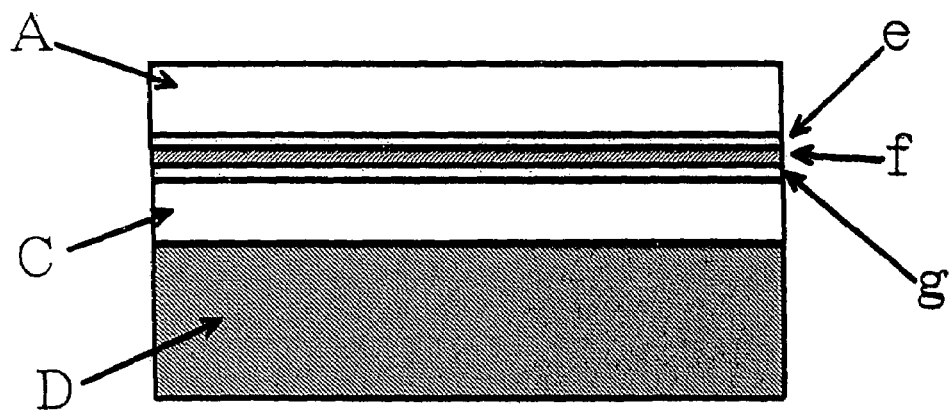
Figure 2   Plastic molded article with a polarization property
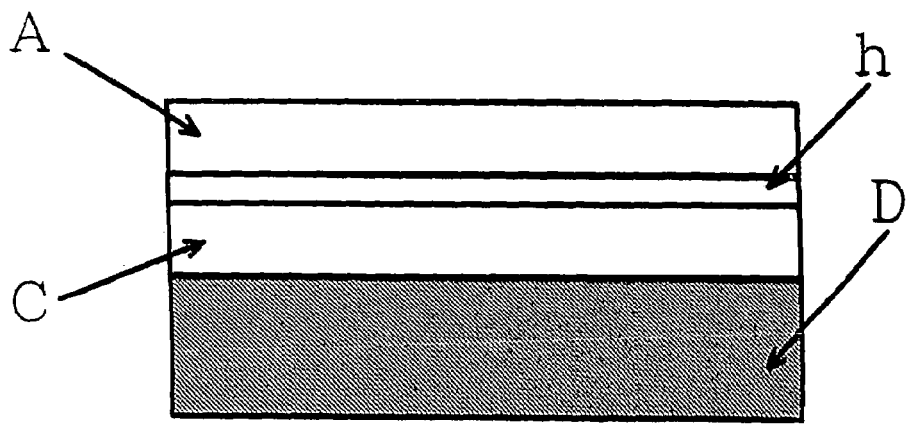
Figure 3   Plastic molded article with a photochromic property

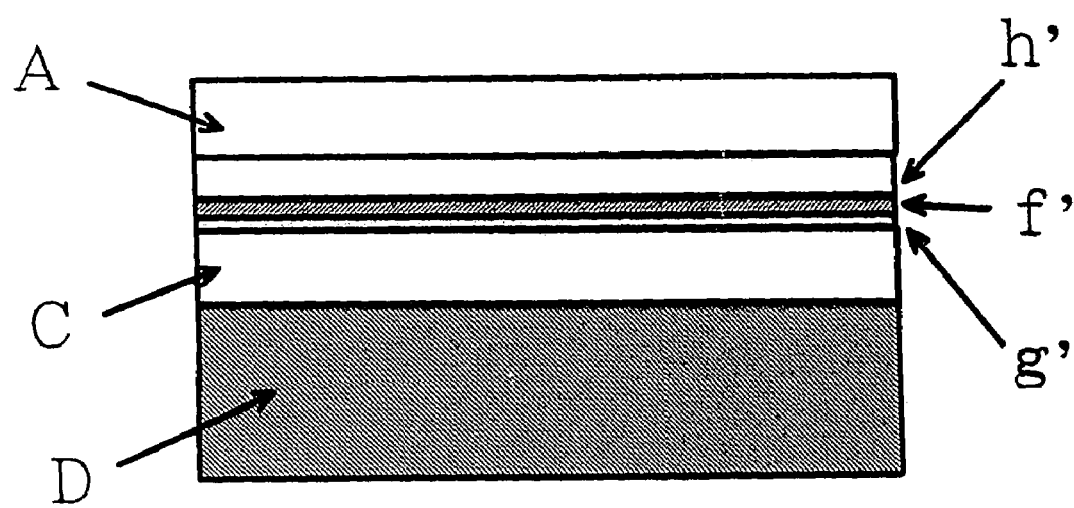
Figure 4 Plastic molded article with both a polarization property and a photochromic property

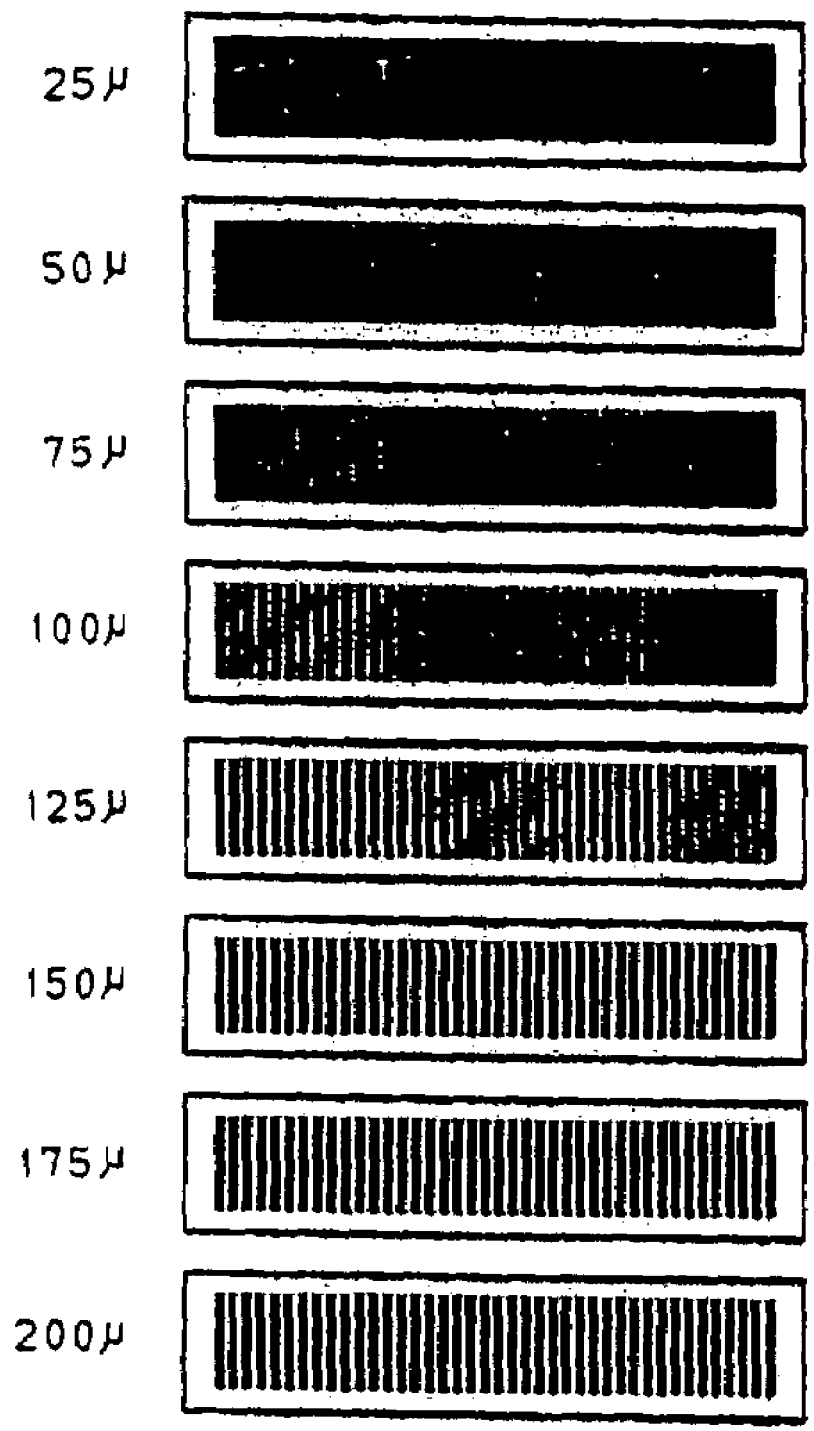
Figure 5  Dimensional table

PLASTIC MOLDED PRODUCT HAVING PHOTOCHROMIC CHARACTERISTIC AND/OR POLARIZING CHARACTERISTICS

This is a National stage entry under 35 U.S.C. § 371 of PCT application Ser. No. PCT/JP01/04634 filed Jun. 1, 2001; the above noted application is hereby incorporated by reference.

FIELD OF ART

The present invention relates to a plastic molded article with excellent optical properties having a glare-reducing ability due to a photochromic property and/or a polarization property, and particularly to a plastic lens molded article having excellent appearance and optical properties which is used for glare-reduction of a sun glass with degree and can be readily produced and processed.

BACKGROUND OF THE INVENTION

Examples of application of a transparent plastic product having a glare-reducing ability include windows for construction, sunroofs and windows for motor car, sun glasses, goggles, illuminations and ornaments.

Particularly, recently, demand for plastic lenses used a transparent aromatic polycarbonate with excellent impact resistance in a sun glass with degree having a glare-reducing ability has rapidly expanded mainly in U.S.A. Thus, lens materials for spectacle having more excellent optical properties than those in an aromatic polycarbonate have been extensively developed.

For example, Japanese Patent Kokai (Laid-open) No.12-63506 discloses that an aromatic-aliphatic copolymerization polycarbonate resin material has balanced and excellent optical properties as a lens material. When an object is seen through a lens applied this material as a lens base material, Abbe's number representing definition of image (Abbe's number: a value representing a degree of color aberration of a lens material) is higher as 39 than 29 of conventional aromatic polycarbonate, so that definite image can be seen.

Further, the refractive index of this material is 1.57 whereas conventional polymethylmethacrylate as an optical material is 1.49. This material has a high refractive index about equivalent to 1.59 of conventional aromatic polycarbonate. When this material is applied to a spectacle lens with degree, it is suitable to a spectacle lens requiring lightness because its thickness can be made thin.

A sunglass with a polarization property has a glare-reducing ability excellent in cutting characteristic against a reflected light. Thus, its usefulness in outdoor activities such as marine sport, skiing and fishing has come to be noticed widely. Recently, its demand has rapidly expanded. Particularly, when it is produced from an aromatic polycarbonate, the above-mentioned tendency is remarkable because it is excellent in impact resistance.

On the other hand, with progress of rapid development for excellent photochromic pigment, a plastic photochromic sunglass with a glare-reducing ability changing transmittance depending on surrounding brightness has been remarkably improved and is rapidly attaining popularity.

However, it is not easy to process the plastic photochromic sunglass. For example, in the production of such polycarbonate lens as described in Japanese Patent Kokai (Laid-open) No.61-5910, when a process comprising adding a photochromic pigment(s) during production of a polycarbonate sheet to be used is applied, a lens thus obtained is insufficient in both response speed and contrast. Also in resins other than polycarbonate, there usually occur some problems that, in a sheet with strength usable as a glare-reducing material, degradation of a photochromic pigment occurs; its kneading is troublesome; contrast of a product to be obtained is low and its response speed is slow.

Further, in a lens base material, when aromatic polycarbonate is applied to the base material, definition of image is, as described above, slightly inferior because its Abbe's number is comparatively small and interior distortion becomes large due to its high photoelastic constant. Therefore, further improvement of optical properties has been desired.

Thus, development of a lens material used a polycarbonate excellent in impact resistance as a lens base material in which distortion of image is small and definition can be secured has been required. Moreover, further improvement of performances of a lens with a glare-reducing ability due to a polarization property or a photochromic property changing transmittance depending on surrounding brightness has been required.

DISCLOSURE OF THE INVENTION

The present invention provides a plastic molded article excellent in both a glare-reducing ability and optical properties having a polarization property and a photochromic property.

As a result of studies of trial and error for various methods, the inventors have found that a plastic molded article excellent in both a glare-reducing ability and optical properties can be obtained by using polycarbonate having a photoelastic constant of $55 \times 10^{-12}$ $m^2/N$ or below as a base material and adding the function of a photochromic property and/or a polarization property to at least one side of the base material and its processing also is easy, and have accomplished the present invention.

That is, the present invention provides a plastic molded article laminated a layer with a photochromic property and/or a layer with a polarization property on at least one side of a base material, said base material being a polycarbonate having a photoelastic constant of $55 \times 10^{-12}$ $m^2/N$ or below as a base material.

The present invention will be described in detail below.

Examples of a process for adding a glare-reducing ability to one side of a plastic base material include a process of coating comprising spraying, painting or impregnating a resin solution containing a photochromic pigment on the base material and then vaporizing a solvent, a process for laminating a film containing a photochromic pigment on the base material and a process for adhering a polarizing film directly to the base material with an adhesive or an adhesive film, by heat deposition or by vibration deposition.

Preferable mode of the process for adding a glare-reducing ability to one side of the plastic base material of the present invention is a process for integrating the plastic base material with a synthetic resin laminate having a glare-reducing ability by injection molding, etc.

It is preferable that the transparent synthetic resin to be used for the synthetic resin laminate is a polycarbonate resin. If it is a resin with strength excellent in both impact resistance and transparency, it can be used in the same manner as in a polycarbonate.

It is preferable that a resin layer with a glare-reducing ability is an urethane resin containing a photochromic pigment(s) and a resin layer with a polarization property is a polarizing film.

Next, the process for using a synthetic resin laminate with a glare-reducing ability as preferable mode of the present invention is described in detail using a cross-sectional diagram.

In FIG. 1, A shows a transparent synthetic resin layer (hereinafter, "(A)"); B shows a resin layer with a photochromic property and/or a resin layer with a polarization property (hereinafter, "(B)"); C shows a transparent synthetic resin layer (hereinafter, "(C)") and D shows a base material of a polycarbonate having a photoelastic constant of $55 \times 10^{-12}$ m$^2$/N or below (hereinafter, "(D)").

When the plastic molded article of the present invention is used as a plastic lens for glare-reduction of a sun glass with degree, the side of (A) is used as outside and the side of (D) is used as inside. For example, a user of a sun glass applied the plastic molded article of the present invention sees objects from (D) side of the sunglass lens inside through (A) side of the outside.

When the synthetic resin laminate is preliminarily processed into curved surfaces, it is processed so as to form a convex shape in (A) side and a concave shape in (C) side. Then, (D) polycarbonate having a photoelastic constant of $55 \times 10^{-12}$ m$^2$/N or below is adhered to (C) side of the laminate to perform integral molding.

At the beginning, (D) polycarbonate having a photoelastic constant of $55 \times 10^{-12}$ m$^2$/N or below to be used as a lens base material is described.

The resin material as a lens base material to be used in the present invention is a polycarbonate having a photoelastic constant of $55 \times 10^{-12}$ m 2/N or below which is an aromatic-aliphatic copolymerization polycarbonate, an aliphatic polycarbonate, or a mixture containing 40% or below and preferably 10 to 30% of an aromatic polycarbonate to said aromatic-aliphatic copolymerization polycarbonate or said aliphatic polycarbonate in a weight proportion. When the mixing proportion of an aromatic polycarbonate is above 40%, an Abbe's number of the lens base material becomes 35 or below, and further when an object is seen through the lens, definition of its image is deteriorated.

High impact strength as a feature of an aromatic polycarbonate can be secured from the viewpoint of impact resistance, but it is excess impact strength as use for a spectacle.

The aromatic-aliphatic copolymerization polycarbonate as preferable mode to be used in the present invention, as disclosed in Japanese Patent Kokai (Laid-open) No.12-63506, is an aromatic-aliphatic copolymerization polycarbonate resin with good color prepared by melt transesterification of 1,1-bis-(4-hydroxyphenyl) cyclohexane and tricyclo (5.2.1.0$^{2,6}$) decanedimethanol in the presence of carbonic acid diester.

Further, the aromatic-aliphatic polycarbonate as other preferable mode to be used in the present invention, as disclosed in Japanese Patent Kokai (Laid-open) No.12-302860, is an aromatic-aliphatic copolymerization polycarbonate resin with good color prepared by melt transesterification of pentacyclopentadecanedimethanol and bisphenols in the presence of carbonic acid diester.

Moreover, as other preferable modes to be used in the present invention, an aromatic-aliphatic polycarbonate composed of an aromatic polycarbonate and an aliphatic polycarbonate such as an aliphatic polycarbonate to be obtained by melt transesterification of pentacyclopentadecanedimethanol in the presence of carbonic acid diester disclosed in Japanese Patent Kokai (Laid-open) No.12-302860, an aliphatic polycarbonate to be obtained by melt transesterification of pentacyclopentadecanedimethanol and cyclohexane-1,4-dimethanol in the presence of carbonic acid diester disclosed in Japanese Patent Kokai (Laid-open) No.2001-11169, an aliphatic polycarbonate to be obtained by melt transesterification of pentacyclopentadecanedimethanol and tricyclo (5.2.1.0$^{2,6}$) decanedimethanol in the presence of carbonic acid diester disclosed in Japanese Patent Kokai(laid-open) No.2001-11168, an aliphatic polycarbonate to be obtained by melt transesterification of pentacyclopentadecanedimethanol and norbornanedimethanol in the presence of a carbonic acid diester disclosed in Japanese Patent Kokai(Laid-open) No.2001-11166, an aliphatic polycarbonate to be obtained by melt transesterification of pentacyclopentadecanedimethanol and decalin-2,6-dimethanol in the presence of carbonic acid diester disclosed in Japanese Patent Kokai (Laid-open) No.2001-11165, etc., can be suitably used. The amount of pentacyclopentadecanedimethanol to be used in the above-mentioned aliphatic polycarbonate is 30 to 95 mol % to all diol compounds.

It is preferable that the aromatic polycarbonate is a polycarbonate derived from bisphenol A.

Next, the synthetic resin layer composed of (A), (B) and (C) is described.

The (A) and (C) are not limited so long as they are a high transparent resin. It is preferable to use an aromatic polycarbonate resin, an aromatic-aliphatic copolymerization polycarbonate resin, an aliphatic polycarbonate resin, a resin composed of an aromatic polycarbonate or an aliphatic polycarbonate and an aromatic-aliphatic copolymerization polycarbonate or a polymethylmethacrylate resin. Regarding the combination of the two transparent synthetic resins, each of the two transparent synthetic resins is an aromatic polycarbonate resin, an aromatic-aliphatic copolymerization polycarbonate, an aliphatic polycarbonate, a resin composed of an aromatic polycarbonate and an aromatic-aliphatic copolymerization or an aliphatic polycarbonate, a polymethylmethacrylate resin or a combination thereof and a transparent synthetic resin having a thickness of 100 to 2000 μm is applied. Particularly, when bending into a lens shape is preliminarily preformed, it is preferable to use a synthetic resin sheet having a thickness of 100 to 1000 μm.

Particularly, when an injection molding is applied, it is necessary that the thickness of (C) is at least 100 μm. When it is below this range, wrinkle or crack readily occurs.

The (B) is a resin layer with polarization property and/or a resin layer with a photochromic property.

Firstly, the plastic lens molded article with a polarization property in FIG. 2 is described.

It is preferable that (A) has a thickness of at least 50 μm and a retardation value (hereinafter, "Re") of 150 nm or below or at least 3000 nm and substantially, (A) is a sheet to transmit a light with a wave length of at least 350 nm.

In the present invention, retardation value (nm) of the synthetic resin layer is defined in the following formula.

$$\text{Retardation value } (Re)(nm) = \Delta n \times d$$

wherein Δn is birefringence of the synthetic resin layer and d is a thickness (nm) of the synthetic resin layer.

When it is used as a glare-reducing material outside the above-mentioned range of Re, it is not preferable since colored interference figure is generated.

When an aromatic polycarbonate, an aromatic-aliphatic copolymerization polycarbonate, an aliphatic polycarbonate or a blend resin of an aromatic polycarbonate and an aromatic-aliphatic copolymerization polycarbonate or an aliphatic polycarbonate is used as (A), it is required that they have a thickness of 50 to 200 μm and Re of 150 nm or below or a thickness of 300 μm to 1 mm and Re of at least 3000 nm. Outside the above-mentioned range, the following some problems occur.

(1) In processing into curved surfaces, interference figure comes to be observed (2) Satisfactory strength is not exhibited.

(3) A processed article with good appearance cannot be obtained.

(4) Polarization property is deteriorated in an injection molding (5) It is not practical because it is difficult to obtain a raw material.

The polycarbonate with the above-mentioned retardation value in the present invention can be produced, for example, by the following process.

That is, a sheet having a retardation value of 150 nm or be low can be produced by a casting process or a non-stretching extrusion process. Further, a sheet having a retardation value of at least 3000 nm can be produced by preparing a sheet in an extrusion process and stretching it substantially toward one direction while heating at a little higher temperature (e.g., about 130 to about 180° C.) than its glass transition point. In this case, the stretching degree influences upon the retardation value.

The "e" and "g" in FIG. 2 are an adhesive layer. Any adhesive to be used for adhesion of conventional PC film and a polarizing film may be applied. A polyurethane resin is preferably applied as the adhesive.

Particularly, from the viewpoint of post processing, it is preferable to use a two-liquid type polyurethane composed of polyurethane prepolymer and a curing agent. It is preferable that its thickness is in the range of 5 to 100 μm and it is more preferable that it is in the range of 5 to 50 μm. When the thickness is below 5 μm, it is difficult to obtain satisfactory adhesive strength. When it is above 100 μm, adhesive strength is satisfactory, but it takes a time to vaporize a solvent in the adhesive layer, so that productivity and economy become bad. It is possible also to provide UV cutting potency to this laminate by adding a UV absorbent to this layer.

As described above, when an injection molding is applied, it is necessary that (C) has a thickness of at least 100 μm. When it is below this range, wrinkle or crack readily occurs during injection molding. It is necessary that the thickness of (C) is selected for total thickness of the synthetic resin laminate of the present invention so as to become at least 0.6 mm from the viewpoints of strength and quality except the case where the thickness is increased later by a process such as injection molding.

As described above, it is preferable that the urethane type resin to be used as the adhesive layer is a two-liquid type polyurethane of a polyurethane prepolymer and a curing agent, considering productivity and necessary apparatus.

As the above mentioned polyurethane prepolymer, a compound obtained by reaction of isocyanate and polyol in a specific proportion is used. That is, the polyurethane prepolymer is a compound with an isocyanate group on both ends to be obtained from diisocyanate and polyol. It is preferable that the diisocyanate compound to be used for the polyurethane prepolymer is diphenylmethane-4,4'-diisocyanate (MDI). Further, as the polyol, it is preferable to use polypropyleneglycol (PPG) having a polymerization degree of 5 to 30.

The number average molecular weight of the polyurethane prepolymer is 500 to 5000, preferably 1500 to 4000 and more preferably 2000 to 3000.

On the other hand, the above-mentioned curing agent is not limited so long as it is a compound with at least two hydroxyl groups. Examples of the curing agent include polyurethane polyol, polyether polyol, polyester polyol, acrylic polyol, polybutadiene polyol and polycarbonate polyol, among which polyurethane polyol with a hydroxyl group on ends to be obtained from specific isocyanate and specific polyol is preferable. Particularly, polyurethane polyol with a hydroxyl group on at least both ends to be derived from diisocyanate and polyol is preferable. It is preferable to use tolylenediisocyanate (TDI) as the diisocyanate. It is preferable to use PPG having a polymerization degree of 5 to 30 as the polyol.

The number average molecular weight of the curing agent is 500 to 5000, preferably 1500 to 4000 and more preferably 2000 to 3000.

It is preferable to apply a ratio (I/H) of isocyanate group (I) of polyurethane prepolymer to hydroxyl group (H) of curing agent of 0.9 to 20 and preferably 1 to 10 as a criterion.

In order to adjust a viscosity of the polyurethane prepolymer and the curing agent, solvents such as ethyl acetate, tetrahydrofuran and toluene may be used.

The "f" in FIG. 2 is a polarizing sheet and may be basically any polarizing film. It is preferable that its thickness is 10 to 100 μm. When the thickness is below this range, strength becomes poor or it is difficult to obtain intended polarization property. On the other hand, when it is above this range, it is difficult to obtain uniformity of the thickness, so that color un-uniformity readily occurs. Iodine type polarizing films are not so preferable, considering that processing with heating such as injection molding is performed. A dye type polarizing film is preferable. Particularly, as described in Japanese Patent Kokai (Laid-open) No.63-311203, a film with high heat resistance to be produced by a process of production comprising conducting a particular treatment with a metal ion(s) and boric acid to stabilize the film is preferable. Further, it is very preferable to use a polarizing film with a UV cutting characteristic.

Particularly, preferable process for producing the plastic lens molded article with a polarization property of the present invention is as follows.

A resin liquid containing a polyurethane prepolymer and a curing agent is coated on a polarizing film. Then, it is standing at a temperature of 20 to 50° C. over about 5 to about 60 minutes. Then, the resin liquid layer is adhered to a transparent synthetic resin sheet. An adhesive containing a solvent is coated on the polarizing film side of a laminate thus obtained. Then, it is standing at a temperature of 20 to 50° C. for about 5 to about 60 minutes to vaporize the solvent and then another transparent synthetic resin layer is adhered to the adhesive. The laminate is heat cured usually at 60 to 140° C. over 2 hours to one week, whereby a synthetic resin laminate with a polarization property is produced. Then, drawing is stamped out according to a lens shape. A flat sheet is maintained or bending into a lens shape is performed in a vacuum compression. When an injection molding is applied, the flat sheet article or an article subjected to bending is installed in a mold and a polycarbonate having a photoelastic constant of $55 \times 10^{-12}$ m$^2$/N or below is injected into the mold, whereby a plastic lens molded article adhered the flat sheet article or the article subjected to bending is obtained.

Next, the plastic lens molded article with a photochromic property in FIG. 3 is described.

As described above, the (A) and (C) are not limited so long as they are a high transparent resin.

The "h" in FIG. 3 constituting a resin layer with a photochromic property of (B) is a resin layer containing a photochromic pigment(s) and it is preferable that it is an urethane type resin layer containing a photochromic pigment(s). It is preferable that its thickness is 50 to 250 μm. When the thickness is below this range, color development in irradiation of an ultraviolet light is insufficient, so that contrast becomes low. When the thickness is above this range, contrast is sufficient, but economy becomes bad because a large amount of very expensive photochromic pigment is used. The photochromic pigment is not limited so long as it has compatibility with an urethane type resin layer. It is preferable that it is spiropyran compounds, spiroxazine compounds and naphtopyran compounds.

It is possible also to provide a UV cutting potency with the laminate by adding an UV absorbent to this layer.

As processes for forming an urethane type resin layer containing a photochromic pigment(s), the following various processes can be applied.

(1) A process comprising dissolving an polyurethane resin and a photochromic pigment(s) in a solvent, coating a solution thus obtained on (A) or (C) and then vaporizing the solvent and adhering it to (C) or (A) with heating.

(2) A process comprising heat melt adhering an polyurethane resin mixed a photochromic pigment(s) on a transparent resin sheet so as to maintain its thickness to a uniform thickness.

(3) A process comprising coating a resin liquid dissolved a photochromic pigment(s) and a curing agent in a polyurethane prepolymer on (A) or (C) and vaporizing a solvent (in case of containing a solvent) and then adhering its surface to (C) or (A) and then performing cure.

All of these processes can be applied in principle.

Examples of the spiropyran compound to be contained in the above-mentioned urethane resin layer containing a photochromic pigment(s) include 1',3',3'-trimethylspiro(2H-1-benzopyran-2,2'-indoline), 1',3',3'-trimethylspiro-8-nitro (2H-1-benzopyran-2,2'-indoline), 1',3',3'-trimethyl-6-hydroxyspiro(2H-1-benzopyran-2,2'-indoline), 1',3',3'-trimethyl-spiro-8-methoxy(2H-1-benzopyran-2,2'-indoline), 5'-chloro-1',3',3'-trimethyl-6-nitrospiro(2H-1-benzo-pyran-2,2'-indoline), 6,8-dibromo-1',3',3'-trimethylspiro(2H-1-benzopyran-2,2'-indoline), 6,8,-dibromo-1',3',3'-trimethylspiro(2H-1-benzopyran-2,2'-indoline), 8-ethoxy-1',3',3',4',7'-pentamethylspiro(2H-1-benzopyran-2,2'-indoline), 5'-chloro-1',3',3'-trimethylspiro-6,8-dinitro (2H-1-benzopyran-2,2'-indoline), 3,3,1-diphenyl-3H-naphtho (2,1-b)pyran, 1,3,3-triphenylspiro[indoline-2, 3'-(3H)-naphtho (2,1-b)pyran], 1-(2,3,4,5,6-pentamethylbenzyl)-3,3-dimethylspiro[indoline-2,3'-(3H)-naphtho(2,1-b)pyran), 1-(2-methoxy-5-nitrobenzyl)-3,3-dimethylspiro[indoline-2,3'-naphtho(2,1-b)pyran], 1-(2-nitrobenxzyl)-3,3-dimethylspiro[indoline-2,3'-naphtho(2,1-b)pyran], 1-(2-naphthylmethy)-3,3-dimethylspiro[indoline-2,3'-naphtho(2,1-b)pyran]and 1,3,3-trimethyl-6'-nitro-spiro [2H-1-benzopyran-2,2'-[2H]-indole].

Examples of the spiroxazine compound to be contained in the above-mentioned urethane type resin layer containing a photochromic pigment(s) include 1,3,3-trimethylspiro[indolino-2,3'-[3H]naphtho[2,1-b][1,4]oxazine], 5-methoxy-1, 3,3-trimethylspiro[indolino-2,3'-[3H]naphtho[2,1-b][1,4] oxazine], 5-chloro-1,3,3-trimethylspiro[indolino-2,3'-[3H] naphtho[2,1-b][1,4]oxazine], 4,7-diethoxy-1,3,3-trimethyl-spiro[indolino-2,3'-[3H]naphtho[2,1-b][1,4]oxazine], 5-chloro-1-butyl-3,3-dimethylspiro[indolino-2,3'-[3H] naphtho[2,1-b][1,4]oxazine], 1,3,3,5-tetramethyl-9'-ethoxyspiro[indolino-2,3'-[3H]naphtho[2,1-b][1,4]oxazine], 1-benzyl-3,3-dimethylspiro[indoline-2,3'-[3H]naphtho[2,1-b][1,4]oxazine], 1-(4-methoxybenzyl)-3,3-dimethylspiro [indoline-2,3'-[3H]naphtho[2,1-b][1,4]oxazine], 1-(2-methylbenzyl)-3,3-dimethylspiro[indoline-2,3'-[3H]naphtho[2,1-b][1,4]oxazine], 1-(3,5-dimethylbenzyl)-3,3-dimethylspiro [indoline-2,3'-[3H]naphtho[2,1-b][1,4]oxazine], 1-(4-chloro-benzyl)-3,3-dimethylspiro[indoline-2,3'-[3H] naphtho[2,1-b][1,4]oxazine], 1-(4-bromobenzyl)-3,3-dimethylspiro[indoline-2,3'-[3H]naphtho[2,1-b][1,4] oxazine], 1-(2-fluorobenzyl)-3,3-dimethylspiro[indoline-2, 3'-[3H]naphtho[2,1-b][1,4]oxazine], 1,3,5,6-tetramethyl-3-ethylspiro[indoline-2,3'-[3H]pyrido[3,2-f][1,4] benzoxazine], 1,3,3,5,6-pentamethylspiro[indoline-2,3'-[3H]pyrido[3,2-f][1,4]benzoxazine], 6'-(2,3-dihydro-1H-indole-1-yl)-1,3-dihydro-3,3-dimethyl-1-propyl-spiro[2H-indole-2,3'-[3H]naphtho[2,1-b][1,4]oxazine], 6'-(2,3-dihydro-1H-indole-1-yl)-1,3-dihydro-3,3-dimethyl-1-(2-methylpropyl)-spiro[2H-indole-2,3'-[3H]naphtho[2,1-b][1, 4]oxazine], 1,3,3-trimethyl-1-6'-(2,3-dihydro-1H-indole-1-yl)spiro[2H-indole-2,3'-[3H]naphtho[2,1-b][1,4]oxazine], 1,3,3-trimethyl-6'-(1-piperidinyl)spiro[2H-indole-2,3'-[3H] naphtho[2,1-b][1,4]oxazine]1,1,3,3-trimethyl-6'-(1-piperidinyl)-6-(trifluoromethyl)-spiro[2H-indole-2,3'-[3H] naphtho[2,1-b][1,4]oxazine]and 1,3,3,5,6-pentamethyl-spiro[2H-indole-2,3'-[3H]naphtho[2,1-b][1,4]oxazine].

Examples of the naphthopyran compound to be contained in the above-mentioned urethane type resin layer containing a photochromic pigment(s) include 3,3-diphenyl-3H-naphtho[2,1-b]pyran, 2,2-diphenyl-2H-naphtho[1,2-b]pyran, 3-(2-fluorophenyl)-3-(4-methoxyphenyl)-3H-naphtho[2,1-b]pyran, 3-(2-methyl-4-methoxyphenyl)-3-(4-ethoxyphenyl)-3H-naphtho[2,1-b]pyran, 3-(2-furil)-3-(2-fluorophenyl)-3H-naphtho[2,1-b]pyran, 3-(2-thienyl)-3-(2-fluoro-4-methoxyphenyl)-3H-naphtho[2,1-b]pyran, 3-{2-(1-methylpyrrolyl)}-3-(2-methyl-4-methoxyphenyl)-3H-naphtho[2,1-b]pyran, spiro(bicyclo[3.3.1]nonane-9,3'-3H-naphtho[2,1-b]pyran], spiro[bicyclo[3.3.1]nonane-9,2'-3H-naphtho[2,1-b]pyran], 4-[4-[6-(4-morpholinyl)-3-phenyl-3H-naphtho[2,1-b]pyran-3-yl]phenyl]-morpholine, 4-[3-(4-methoxyphenyl)-3-phenyl-3H-naphtho[2,1-b]pyran-6-yl]-morpholine, 4-[3,3-bis(4-methoxyphenyl)-3H-naphtho[2,1-b]pyran-6-yl]-morpholine, 4-[3-phenyl-3-[4-(1-piperidinyl) phenyl]-3H-naphtho[2,1-b]pyran-6-yl]-morpholine and 2,2-diphenyl-2H-naphtho[2,1-b]pyran.

It is preferable that the urethane type resin to be used in the above-mentioned urethane type resin layer containing a photochromic pigment(s) is a two-liquid type polyurethane of a polyurethane prepolymer and a curing agent to be used as an adhesive for the above-mentioned plastic lens molded article with a polarization property, considering productivity and necessary apparatus.

Particularly, a preferable process for producing a plastic lens molded article with a photochromic property of the present invention is as follows.

A resin liquid containing a photochromic pigments(s), a polyurethane prepolymer and a curing agent is coated on a transparent resin layer. Then, it is standing at a temperature of 20 to 50° C. for about 5 minutes to about 60 minutes. Then, another transparent synthetic resin sheet is adhered to the resin solution layer. The laminate thus obtained is heat cured usually at 60 to 140° C. over 2 hours to one week, whereby a synthetic resin laminate is produced. Then, drawing is stamped out according to a lens shape. A flat sheet is maintained or bending into a lens shape is performed in a vacuum compression. When an injection molding is applied, the flat sheet article or the article subjected to bending is installed in a mold and a polycarbonate having a photoelastic constant of $55 \times 10^{-12}$ m²/N or be low is injected into the mold, whereby a plastic lens molded article adhered the flat sheet article or the article subjected to bending is obtained.

Next, the plastic lens molded article with both a photochromic property and a polarization property in FIG. 4 is described.

As described above, the (A) and (C) are not limited so long as they are a high transparent resin. The same substance as in the plastic lens molded article with a polarization property can be applied to them. It is preferable that (A) has a thickness of at least 50 μm and a retardation value (hereinafter, "Re") of 150 nm or below or at least 3000 nm and substantially, (A) is a sheet to transmit a light with a wave length of at least 350 nm.

As described above, when an injection molding is applied, it is necessary that (C) has a thickness of at least 100 μm.

The "h'" in FIG. 4 is a resin layer containing a photochromic pigment(s). The same substance as in the above-mentioned plastic lens molded article with a photochromic property can be applied. It is preferable that it is an urethane type resin layer containing a photochromic pigments(s) and its thickness is 50 to 250 μm.

The "f'" in FIG. 4 is a polarizing film. The same substance as in the above-mentioned plastic molded article with a polarization property can be applied to it. It is preferable that it has a comparatively high transmittance of at least 30% and a thickness of 10 to 100 μm. When its transmittance is below 30% it becomes difficult to see objects due to too high glare-reducing ability during irradiation of an ultraviolet light because it has also a photochromic property together.

The "g'" in FIG. 4 is an adhesive layer. The same substance as in the above-mentioned plastic molded article with a polarization property can be applied to it. Particularly, it is preferable that it is the above-mentioned two-liquid type polyurethane of a polyurethane prepolymer and a curing agent.

Preferable process for producing a plastic lens molded article with both a photochromic property and a polarization property of the present invention is as follows.

A resin liquid containing a photochromic pigment(s), a polyurethane prepolymer and a curing agent is coated on a polarizing film. Then, it is standing at a temperature of 20 to 50° C. for about 5 minutes to about 60 minutes. Then, the resin solution layer is adhered to a transparent synthetic resin sheet. An adhesive containing a solvent is coated on the polarizing film side of the laminate thus obtained. Then, it is standing at a temperature of 20 to 50° C. for about 5 to about 60 minutes to vaporize the solvent and then another transparent synthetic resin layer is adhered to it. The laminate is heat cured usually at 60 to 140° C. over 2 hours to one week. Then, drawing is stamped out according to a lens shape. A flat sheet is maintained or bending into a lens shape is performed in a vacuum compression.

When an injection molding is applied, the flat sheet articles or the article subjected to bending is installed in a mold and a polycarbonate having a photoelastic constant of $55 \times 10^{-12}$ m²/N or below is injected into the mold, whereby a plastic lens molded article adhered to the flat sheet article or the article subjected to bending is obtained.

BRIEF DESCRIPTION OF THE DRAWINGS

FIG. 1 is a sectional view of the plastic molded article of the present invention.

FIG. 2 is a sectional view of the plastic molded article with a polarization property of the present invention.

FIG. 3 is a sectional view of the plastic molded article with a photochromic property of the present invention.

FIG. 4 is a sectional view of the plastic molded article with both a photochromic property and a polarization property of the present invention.

FIG. 5 is a dimensional table used for inspection of definition degree

BEST MODE FOR CARRYING OUT THE INVENTION

The present invention will be described in more detail below, referring to Examples, which are not intended to limit the scope of the present invention.

[Measurement Methods]
(1) Transmittance was measured with a spectrophotometer, manufactured by Nihon Bunko k. k.
(2) Single sheet transmittance, parallel position transmittance ($H_0$: light transmittance where the same species of two polarizing films or two sheets to each other are overlapped so as to pose orientation direction toward the same direction to each other) and perpendicularly crossing position transmittance ($H_{90}$: light transmittance where the same species of two polarizing films or two sheets to each other are overlapped so as to pose orientation direction toward a direction perpendicular to each other) are an average value made a correction of visible sensitivity in a visible radiation of 400 to 700 nm.
(3) Polarization degree was determined from the following formula.

$$H\ (\%) = \sqrt{\frac{H_0 - H_{90}}{H_0 + H_{90}}} \times 100\%$$

(4) Retardation value of a sheet was measured with a polarizing microscope (manufactured by Oak Seisakusho, TEM-120AFT).
(5) Abbe's number was measured by an Abbe's refractometer (manufactured by k. k., Atago) and determined by calculation.

Abbe's number=$(n_D-1)/(n_F-n_C)$ $n_C$, $n_D$, $n_F$: refractive index for C line (λ=656 nm) D line (λ=589 nm), F line (λ=486 nm) of Fraunhofer lines
(6) Photoelastic constant was measured with an auto Ellipsometer (manufactured by Mizojiri Kogaku k. k., type DVA-36L) by applying a load to a resin film sample as a transparent base material.
(7) Transmittance under irradiation of ultraviolet light (after 5 minutes from starting of irradiation) was measured with an ultramonochoromatic light source (manufactured by Nihon Bunko k. k.) while irradiating a single wave length light of 360 nm.
(8) As inspection of definition degree, when a person with an eyesight of 1.0 sees the dimensional table of FIG. 5 through lenses, minimum dimension in the range to be seen definitely was searched. The inspection was performed in a room.

Further, in the dimensional table, forty white blank lines with a line width of uniform specific dimension in a black-painted square formed a rectangle of length 7 mm×width 41 mm were drawn in an equal interval and eight kinds of different line width (the range of from minimum 25 μm to maximum 200 μm in an interval of 25 μm) were drawn.

(9) Regarding observation of photoelastic distortion, a lens molded sample was set between two polarizing sheets and a fluorescent lamp was irradiated from the lower portion of the two polarizing sheets and the state of internal distortion was observed.

EXAMPLE 1

(1) Preparation of Polarizing Film

A polyvinyl alcohol film, manufactured by Kurare k. k., trade name; Kurarevinylone #7500 was dyed at 35° C. for 6 minutes in an aqueous solution (dyeing solution) containing 0.45 g/L of Chlorantin fast red (C.I.: Direct Red 81), 0.40 g/L of Brilliant blue 6B (C.I.: Direct Blue 1), 0.45 g/L of Direct copper blue 2B (C.I.: Direct Blue 168), 1.20 g/L of Primuler blue 6 GL (C.I.: Direct Blue 202) and 0.35 g/L of Chrysophenine (C.I.: Direct Yellow 12) and then stretched 5 times to the direction of uniaxis in the dyeing solution.

Then, the above-mentioned film was immersed in an aqueous solution (treating solution) containing 0.30 g/L of nickel acetate tetrahydrate and 12.2 g/L of boric acid at a room temperature for 3 minutes in the state maintained stretching. Further, the film was taken out from the aqueous solution in the state maintained the tension and water washed and dried, and then subjected to heat treatment at 110° C. for 7 minutes.

The polarizing film thus obtained presented light grey and had a thickness of 30 μm and its optical characteristics were single sheet transmittance: 20.6% and polarization degree: 99.8%.

(2) Preparation of Resin Solution for Adhesive Layer 15 g of a prepolymer, 3 g of a curing agent and 27 g of ethyl acetate were mixed so as to secure uniformity.

The above-mentioned prepolymer was prepared from a polyurethane prepolymer having a NCO group equivalent weight (equivalent weight: average molecular weight per one functional group) of 1500 (prepared from diphenylmethane-4,4'-diisocyanate (MDI) and polypropylene glycol (PPG) having an average polymerization degree of 15). Further, the above-mentioned curing agent is a curing agent having a hydroxyl group equivalent weight of 1050 (prepared from tolylenediisocyanate and polypropylene glycol having an average polymerization degree of 10).

(3) Production of Laminate

The resin solution obtained by the process of (2) as an adhesive was coated with a bar coater #24 on the polarizing film obtained in (1) so as to form a thickness of 10 μm after evaporation of the solvent, and then standing for 10 minutes in the atmosphere of 45° C. Then, the surface coated with the resin solution was adhered to an aromatic polycarbonate film of thickness 300 μm and Re 120 nm.

Then, the resin solution was further coated with a bar coater #24 on the side of the polarizing film and then further standing for 10 minutes in the atmosphere of 45° C. and then an aromatic polycarbonate film of thickness 300 μm and Re 120 nm was adhered thereto.

The laminate thus obtained was heat cured at 70° C. for 2 days. The total thickness of the laminate thus obtained was 680 μm.

The transmittance was 20.2% and the polarization degree was 99.8% and the color was grey.

The appearance of the laminate was very good.

(4) Production of Plastic Lens Molded Article

A flat sheet stamped out preliminarily the laminate prepared in (3) into 70 mm Φ with an injection mold of clamping force 100 ton was installed in a mold of set temperature 110° C. with cavity of a curved form (spherical radius: 250 mm) to adhere to a molded article by injection molding. A polycarbonate having a photoelastic constant of $37 \times 10^{-12}$ m$^2$/N put preliminarily in a hot wind drier at 100° C. for at least 6 hours sufficient to fill the mold cavity in a mold cylinder of set temperature 260° C. was weighed. Then, the molten resin was injected into the cavity of the closed mold installed in advance the flat sheet and then maintained for 10 seconds under 800 kg/cm$^2$ and further for 65 seconds under a retention pressure of 300 kg/cm$^2$ and then the molded article was cool solidified in the mold for 120 seconds.

Then, the mold was opened and the molded article was taken out from the mold. The form of the molded article was center portion thickness 3 mm, outer circumference thickness 9 mm and outer diameter Φ76 mm.

The used polycarbonate resin having a photoelastic constant of $37 \times 10^{-12}$ m$^2$/N is an aromatic-aliphatic copolymerization polycarbonate obtained by a melt transesterification process in the presence of 50 mol of 1,1-bis-(4-hydroxyphenyl) cyclohexane, 50 mol of tricyclo $(5.2.1.0_{2,6})$ decanedimethanol and a carbonic acid diester. The Abbe's number of the resin material is 39.

The flat sheet installed in advance was tight adhered to the surface of the molded article thus obtained and the molded article with good appearance was obtained. Further, the molded article had a polarization property and no rainbow-color interference figure was observed.

When an object was seen through the plastic lens molded article thus obtained, its image was definite. The inspection result of definition degree was shown in Table 1 and good result was obtained. Further, the internal distortion also was small in observation of photoelastic distortion.

EXAMPLE 2

A plastic lens molded article was obtained in the same manner as in Example 1 except that a polycarbonate having a photoelastic constant of $48 \times 10^{-12}$ m$^2$/N was used as a resin material for lens base material.

The used polycarbonate resin having a photoelastic constant of $48 \times 10^{-12}$ m$^2$/N is a blend of an aromatic-aliphatic copolymerization polycarbonate and an aromatic polycarbonate in a weight blending ratio of 70/30, wherein the aromatic-aliphatic copolymerization polycarbonate was obtained by a melt trans-esterification process in the presence of 50 mol of 1,1-bis-(4-hydroxyphenyl) cyclohexane, 50 mol of tricyclo $(5.2.1.0^{2,6})$ decanedimethanol and a carbonic acid diester and the aromatic polycarbonate was derived from bisphenol A. The Abbe's number of the resin material is 36.

The flat sheet installed in advance was tight adhered to the surface of the molded article thus obtained and the molded article with good appearance was obtained. Further, the molded article had a polarization property and no rainbow-color interference figure was observed.

When an object was seen through the plastic lens molded article thus obtained, its image was definite. The inspection result of definition degree was shown in Table 1 and good result was obtained. Further, the internal distortion also was small in observation of photoelastic distortion.

EXAMPLE 3

(1) Preparation of Polarizing Film

It was performed in the same manner as in Example 1.

(2) Production of Laminate

A laminate having a total thickness of about 670 μm was obtained in the same manner as in Example 1 using two polycarbonate sheets having a thickness of 300 μm, Re of 80 nm and a photoelastic constant of $37 \times 10^{-12}$ m$^2$/N.

The used polycarbonate having a photoelastic constant of $37 \times 10^{-12}$ m$^2$/N is an aromatic-aliphatic copolymerization polycarbonate obtained by a melt transesterification process in the presence of 50 mol of 1,1-bis-(4-hydroxyphenyl) cyclohexane, 50 mol of tricyclo (5.2.1.0 $^{2,6}$) decanedimethanol and a carbonic acid diester.

The laminate had transmittance=20.1% and polarization degree=99.8%

A plastic lens molded article was prepared in the same manner as in Example 1 using this laminate. Internal distortion of the plastic lens molded article thus obtained was small and no distortion was observed in its appearance and its appearance was very good, and no interference figure also was observed.

EXAMPLE 4

(1) Preparation of Photochromic Pigment-Containing Resin Solution.

15 g of a prepolymer, 3 g of a curing agent, 0.18 g of a photochromic pigment; 4-[3,3-bis(4-methoxy-phenyl)-3H-naphtho (2,1-b) pyran-6-yl)-morpholine, 0.18 g of a hindered amine compound; [bis(2,2,6,6-tetramethyl-4-piperidinyl) sebacate) and 12 g of tetrahydrofuran were mixed so as to become uniform.

The above-mentioned prepolymer is a polyurethane prepolymer having a NCO group equivalent weight (equivalent weight: average molecular weight per one functional group) of 1500 (prepared from diphenylmethane-4,4'-diisocyanate (MDI) and a polypropylene glycol (PPG) of average polymerization degree 15). Further, the above-mentioned curing agent is a curing agent having a hydroxyl group equivalent weight of 1050 (prepared from tolylene diisocyanate and polypropylene glycol having a average polymerization degree 10).

(2) Production of Laminate

The resin solution obtained by the process of (1) was coated on an aromatic polycarbonate sheet having a thickness of 300 μm with a doctor blade of coating thickness 300 μm, manufactured by Yoshimitsu Seiki k. k., and then standing for 10 minutes in the atmosphere of 45° C. Then, the surface coated with the resin solution was adhered to another aromatic polycarbonate film having a thickness of 300 μm. The thickness of the laminate was 720 μm by measurement with a micrometer. It was found that the thickness of the resin layer having a photochromic property was 120 μm.

The laminate was heat cured at 70° C. for 2 days. The total thickness of the laminate thus obtained was 705 μm.

(3) Production of Plastic Lens Molded Article

A plastic lens molded article having a photochromic property was obtained in the same manner as in Example 1.

A flat sheet installed in advance was tight adhered to the surface of the molded article thus obtained and the appearance of the molded article thus obtained was good. The molded article had a photochromic property and its distortion was small.

The molded article thus obtained had a transmittance=82% in non-irradiation of light and its color was light transparent orange.

On the other hand, it was found that when the sunlight was irradiated for it, its color was changed to deep orange within 10 seconds and when the irradiation was stopped, its color reverted to original light orange in a short time of about 20 seconds.

The single sheet transmittance in irradiation of an ultraviolet light was 52%. Thereby, the visual observation result under the sunlight was numerically supported.

When an object was seen through the plastic lens molded article thus obtained, its image was definite. The inspection result of definition degree was shown in Table 1 and good result was obtained. Further, the internal distortion also was small in observation of photoelastic distortion.

EXAMPLE 5

(1) Preparation of Photochromic Pigment-Containing Resin Solution.

A resin solution was prepared in the same manner as in Example 4.

(2) Preparation of Polarizing Film

A polarizing film was prepared in the same manner as in Example 1 except that an aqueous solution (dyeing solution) containing 0.37 g/L of Chlorantin fast red (C.I.: Direct Red 81), 0.28 g/L, of Brilliant blue 6B (C.I.: Direct Blue 1), 0.28 g/L of Direct copper blue 2B (C.I.: Direct Blue 168), 0.93 g/L of Primuler blue 6 GL (C.I.: Direct Blue 202) and 0.28 g/L of Chrysophenine (C.I.: Direct Yellow 12) changed each mixing amount of the dyes in Example 1 in order to obtain a polarizing film having high transmittance was used.

The polarizing film thus obtained presented light grey and its thickness was 30 μm and its optical properties were single sheet transmittance=41.8% and polarization degree=96.3%.

(3) Preparation of Resin Solution for Adhesive Layer

It was performed in the same manner as in Example 1.

(4) Production of Laminate

The resin solution obtained by the process of (1) was coated on the polarizing film obtained in (2) with a doctor blade of coating thickness 300 μm, manufactured by Yoshimitsu Seiki k. k., and then standing for 10 minutes in the atmosphere of 45° C. Then, the surface coated with the resin solution was adhered to a polycarbonate film having a thickness of 120 μm and Re of 60 nm. The thickness of the laminate was 313 μm by measurement with a micrometer. It was found that the thickness of the resin layer having a photochromic property was 163 μm.

Then, an urethane type adhesive was coated with a bar coater #24 on the side of the polarizing film so as to maintain the thickness after evaporation of the solvent to 10 μm. Then, after the completion of evaporation of the solvent, a polycarbonate sheet having a thickness of 300 μm was adhered.

The laminate was heat cured at 70° C. for 2 days. The total thickness of the laminate thus obtained was 620 μm.

When no light was irradiated, the transmittance was 41.5% and the polarization degree was 96.3%. Thus, its optical properties were about the same as those of polarizing film itself. Its color was light grey.

On the other hand, it was found that when the sunlight was irradiated for it, its color was changed to deep brown within 10 seconds and when the irradiation was stopped, the color reverted to original light grey in a short time of about 10 seconds.

The single sheet transmittance was 23.0% and the polarization degree was 96.3% in irradiation of an ultraviolet light. Thereby, the visual observation result under the sunlight was numerically supported. The appearance of the laminate was very good.

(5) Production of Plastic Lens Molded Article

A plastic lens molded article was obtained in the same manner as in Example 1.

A flat sheet installed in advance was tight adhered to the surface of the molded article thus obtained and the appearance of the molded article was good. The molded article had both a photochromic property and a polarization property and its distortion was small.

The molded article thus obtained had a transmittance=41.2% in non-irradiation of light and its color was light transparent grey.

On the other hand, it was found that when the sunlight was irradiated for it, its color was changed to deep brown within 10 seconds and when the irradiation was stopped, its color reverted to original light grey in a short time of about 20 seconds.

The single sheet transmittance in irradiation of an ultraviolet light was 22.8%. Thereby, the visual observation result under the sunlight was numerically supported.

When an object was seen through the plastic lens molded article thus obtained, its image was definite. The inspection result of definition degree was shown Table 1 and good result was obtained. Further, internal distortion also was small in observation of photoelastic distortion.

COMPARATIVE EXAMPLE 1

A plastic lens molded article with a polarization property was obtained in the same manner as in Example 1 except that an aromatic polycarbonate having a photoelastic constant of $78 \times 10^{-12}$ m$^2$/N (manufactured by Mitsubishi Gas Chemical Co. Inc., IUPILON H4000) was used as a resin material for lens base material and the cylinder set temperature of the injection mold was changed to 280° C. and the mold set temperature was changed to 120° C.

Regarding the appearance of the sample thus obtained, when it was seen from the convex side of outside, rainbow-color interference figure to cause internal distortion of the lens base material was observed and its appearance was bad.

Further, when an object was seen through the plastic lens molded article thus obtained, its image was not so definite as that in Example 1. The inspection result of definition degree was shown in Table 1 and its definition was inferior to that in Example 1. Further, the internal distortion was comparatively large in observation of photoelastic distortion.

COMPARATIVE EXAMPLE 2

A plastic lens molded article with a photochromic property was obtained in the same manner as in Example 4 except that an aromatic polycarbonate having a photoelastic constant of $78 \times 10^{-12}$ m$^2$/N (manufactured by Mitsubishi Gas Chemical Co, Inc., IUPILON H4000) was used as a resin material for lens base material and the cylinder set temperature of the injection mold was changed to 280° C. and the mold set temperature was changed to 120° C.

The single sheet light of the molded article thus obtained was 82% in non-irradiation of light and its color was light transparent orange.

On the other hand, it was found that when the sunlight was irradiated for it, its color was changed to deep orange within 10 seconds and when the irradiation was stopped, its color reverted to original light orange in a short time of about 20 seconds.

The single sheet transmittance in irradiation of an ultraviolet light was 52%. Thereby, the visual observation result under the sunlight was numerically supported.

Further, when an object was seen through the plastic lens molded article thus obtained, its image was not so definite as that in Example 4. The inspection result of definition degree was shown in Table 1 and its definition was inferior to that in Example 4. Further, the internal distortion was comparatively large in observation of photoelastic distortion.

INDUSTRIAL APPLICABILITY

The plastic lens of the present invention can be suitably applied to use of glare-reduction because it has both a polarization property and/or a photochromic property and the combination with an injection molding makes easy a production of synthetic resin sunglass with degree.

TABLE 1

| | Inspection of definition degree | |
| --- | --- | --- |
| | Minimum dimension (μm) in the range to be seen definitely | Observation of photoelastic distortion |
| Example 1 | 50 | ○ |
| Example 2 | 50 | ○ |
| Example 3 | 50 | ○ |
| Example 4 | 50 | ○ |
| Example 5 | 50 | ○ |
| Comp. Ex. 1 | 100 | Δ |
| Comp. Ex. 2 | 75 | Δ |

Note 1)
As results of observation of photoelastic distortion,
○ mark represents that internal distortion is comparatively small and
Δ mark represents that internal distortion is comparatively large.

The invention claimed is:

1. A plastic molded article comprising a synthetic resin laminate having two transparent synthetic resin layers and a resin layer with a photochromic property containing a photochromic pigment(s) and/or a resin layer with a polarization property comprising a polarizing film interposed between said two transparent synthetic resin layers laminated on at least one side of a base material, said base material being a polycarbonate having a photoelastic constant of $55 \times 10^{-12}$ m$^2$/N or below obtained by a melt transesterification process in the presence of a dihydroxy compound(s) and a carbonic acid ester.

2. The plastic molded article according to claim 1, wherein said plastic molded article is a plastic lens.

3. The plastic molded article according to claim 2, wherein said plastic lens is a spherical shape lens comprising a synthetic resin laminate having two transparent synthetic resin layers and said resin layer with a photochromic property containing a photochromic pigment(s) and/or said resin layer with a polarization property comprising a polarizing film interposed between said two transparent synthetic resin layers on its convex side laminated on at least one side of said base material.

4. The plastic molded article according to claim 1, wherein said polycarbonate having a photoelastic constant of $55\times10^{-12}$ m$^2$/N or below is composed of an aromatic aliphatic copolymerization polycarbonate and an aromatic polycarbonate in a weight ratio of 100/0 to 60/40.

5. The plastic molded article according to claim 1, wherein said polycarbonate having a photoelastic constant of $55\times10^{-12}$ m$^2$/N or below is composed of an aliphatic polycarbonate and an aromatic polycarbonate in a weight ratio of 100/0 to 60/40.

6. The plastic molded article according to claim 1, wherein said two transparent resin layers each are an aromatic polycarbonate.

7. The plastic molded article according to claim 1, wherein at least one of said two transparent resin layers is said synthetic resin laminate comprising a polycarbonate having a photoelastic constant of $55\times10^{-12}$ m$^2$/N or below.

8. The plastic molded article according to claim 1, wherein said resin layer with a photochromic property containing a photochromic pigment(s) comprises (a) a polyurethane obtained from diisocyanate and polyol and (b) a photochromic pigment(s).

9. The plastic molded article according to claim 1, wherein said resin layer with a polarization property comprising a polarizing film is a synthetic resin laminate contains the polarizing film having improved heat resistance and a dichromatic dye.

10. The plastic molded article according to claim 1, wherein said plastic molded article has said resin layer with a polarization property comprising a polarizing film on one side of said base material and said transparent synthetic resin positioned on outside of said resin layer with a polarization property in the transparent synthetic resin layers has a thickness of at least 50 μm and a retardation value 150 nm or below or at least 3000 nm.

11. The plastic molded article according to claim 1, wherein said resin layer with a polarizing property comprising a polarizing film is laminated on one side of said base material and said resin layer with a photochromic property containing photochromic pigment(s) is further laminated on said resin layer with a polarizing property.

12. The plastic molded article according to claim 1, comprising said synthetic resin laminate adhered to at least one side of said base material by an injection molding method.

* * * * *